United States Patent [19]

Preikschat et al.

[11] Patent Number: 4,768,034

[45] Date of Patent: Aug. 30, 1988

[54] RADAR SYSTEM FOR MULTIPLE OBJECT TRACKING AND DISCRIMINATION

[76] Inventors: Fritz K. Preikschat, 16020 Lake Hills Blvd., Bellevue, Wash. 98008; Ekhard Preikschat, 9048 NE. 41st St., Bellevue, Wash. 98004

[21] Appl. No.: 593,555

[22] Filed: Mar. 26, 1984

[51] Int. Cl.$^4$ .......................... G01S 13/00; G01S 5/02
[52] U.S. Cl. .......................... 342/80; 342/90; 342/96; 342/156; 342/424
[58] Field of Search .............. 343/17.1, 463, 465, 343/424; 342/463, 465, 424, 90, 80, 156, 96

[56] References Cited

U.S. PATENT DOCUMENTS

| | | | |
|---|---|---|---|
| 3,113,315 | 12/1963 | Preikschat | 343/113 |
| 3,118,141 | 1/1964 | Bailey | 343/424 |
| 3,161,875 | 12/1964 | Preikschat | 343/7.9 |
| 3,164,827 | 1/1965 | Preikschat | 343/6.5 |
| 3,373,424 | 3/1968 | Thyssens | 343/424 X |
| 3,540,053 | 11/1970 | Sparagna et al. | 343/113 |
| 3,611,381 | 10/1971 | Preikschat et al. | 343/100 |
| 3,949,955 | 4/1976 | Sykes et al. | 244/3.19 |
| 4,060,809 | 11/1977 | Baghdady | 343/453 X |
| 4,170,776 | 10/1979 | MacDoran | 343/458 |
| 4,319,332 | 3/1982 | Mehnert | 343/5 PD X |
| 4,466,067 | 8/1984 | Fontana | 343/424 X |
| 4,532,515 | 7/1985 | Cantrell et al. | 343/424 X |

FOREIGN PATENT DOCUMENTS 3234446  4/1984  Fed. Rep. of Germany ...... 343/424

*Primary Examiner*—Thomas H. Tarcza
*Assistant Examiner*—John B. Sotomayor
*Attorney, Agent, or Firm*—Cristensen, O'Connor, Johnson & Kindness

[57] ABSTRACT

A radar system for tracking a plurality of individual objects that form a cluster. The system comprises means for producing in real time reference information indicative of the position of a reference point associated with the mean position of the objects, and means for producing in real time displacement information indicative of the relative position of each object with respect to the reference point. The system may handle a transmitter, and the means for producing the displacement information may include a interferometer system comprising a central receiver, a pair of first satellite receivers positioned on opposite sides of the central receiver along a first axis that passes through the central receiver, and a pair of second satellite receivers positioned on opposite sides of the central receiver along a second axis that passes through the central receiver and that is inclined with respect to the first axis. The displacement information produced by the interferometer system indicates the position of each object with respect to a virtual coordinate system having one axis coincident with a line from the central receiver to the reference point. Means are described for determining the relative phases and relative arrival times of radar pulses reflected from the objects at each of the recivers. For each receiver, the relative phase and relative arrival time of each return pulse may be transferred to the virtual coordinate system by a separate processor dedicated to that receiver. Separate processors may also be associated with each object, to process the virtual data corresponding to that object and to produce the displacement information for the object.

22 Claims, 7 Drawing Sheets

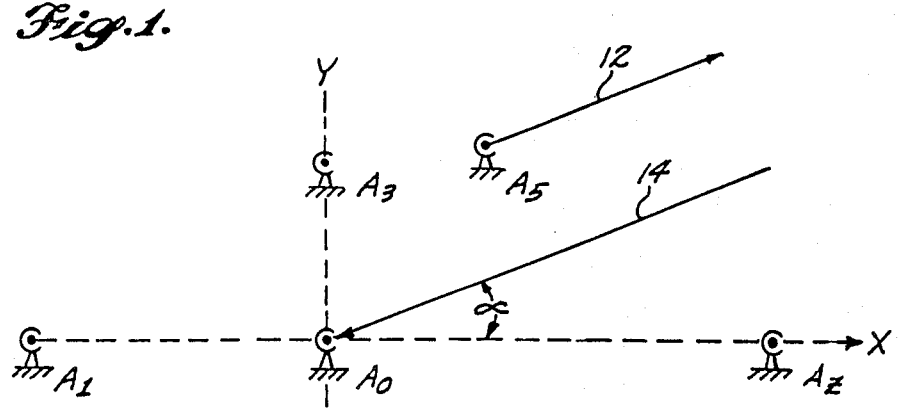
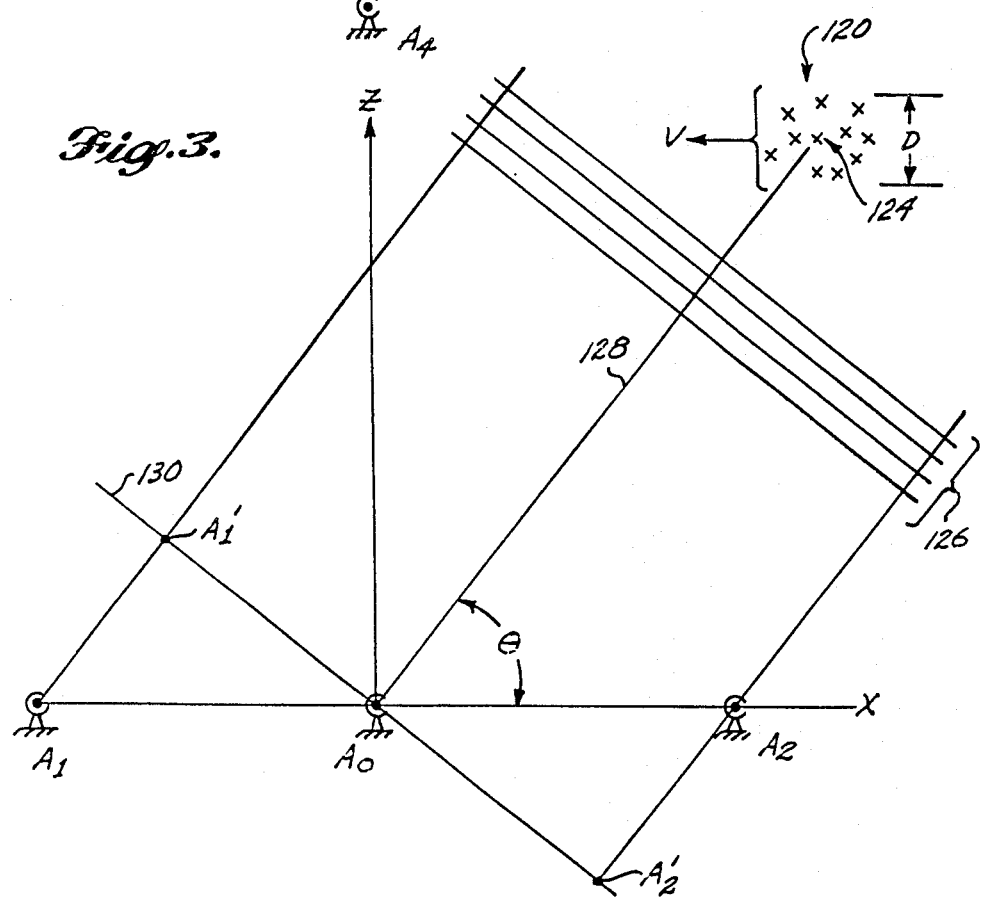

TIME AFTER BEGINNING OF RETURN PULSES
(MICROSECONDS)

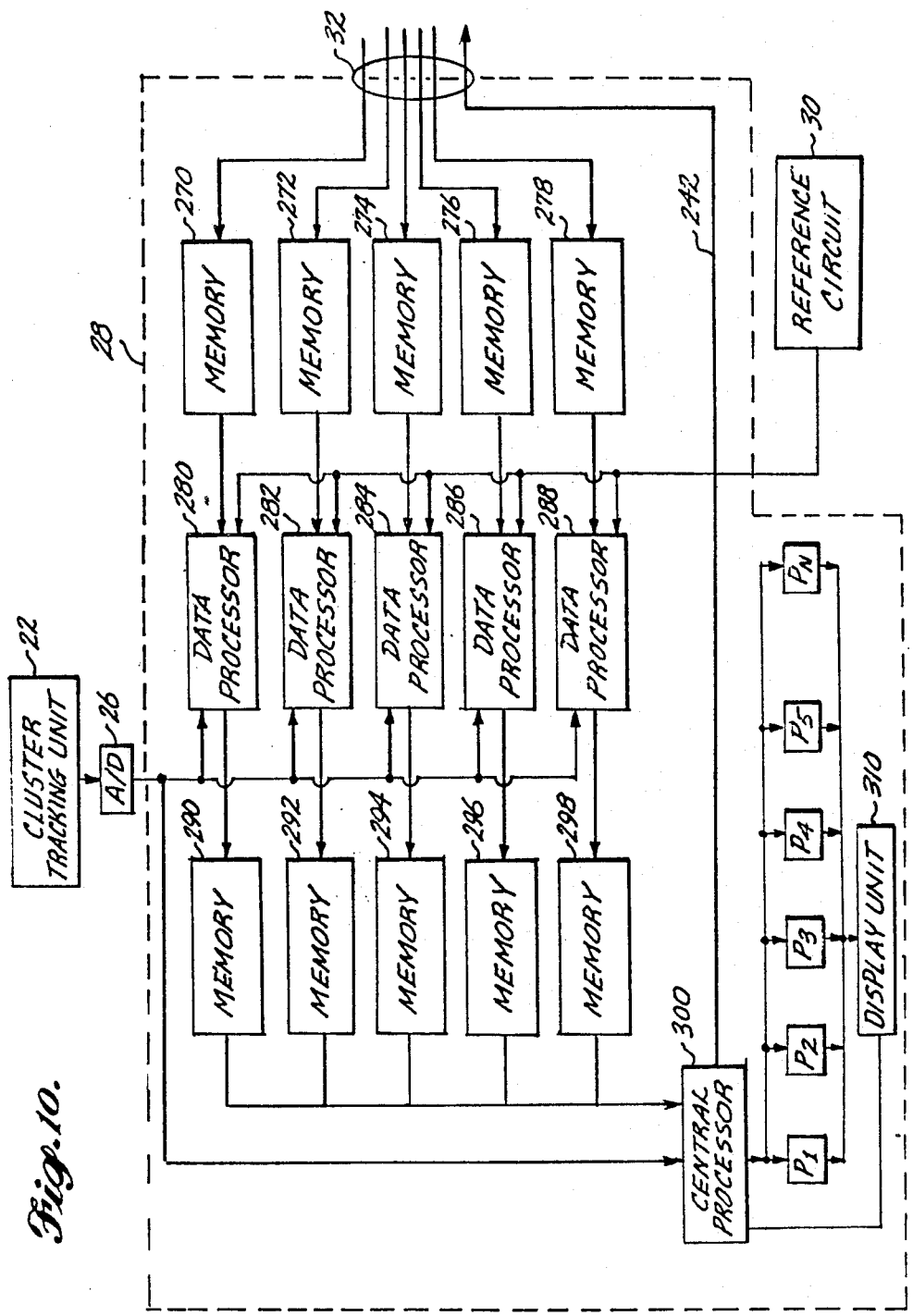

RADAR SYSTEM FOR MULTIPLE OBJECT TRACKING AND DISCRIMINATION

FIELD OF THE INVENTION

This invention generally relates to radar systems for determining the positions of individual objects within a cluster of objects, and for providing information concening the radar characteristics of the individual objects.

BACKGROUND OF THE INVENTION

The present invention is intended for the real time tracking of individual objects within a cluster of objects at a range of several hundred kilometers with a resolution of a meter or less. Conventional radars are not accurate enough to provide these capabilities, and an interferometer based system is the only technology available today that can potentially provide the necessary resolution for such an application. Broad baseline interferometer systems have long been used in radio astronomy to accurately determine the position of distant objects in deep space, and have provided better resolution than could be obtained using optical techniques.

A radar interferometer system includes two or more antennas located at some distance from each other. Each of the antennas receives the same signal reflected from a given object, but with different phase angles and time delays. By measuring these phase and time differences, one can get extremely high angular accuracies, depending on the distance of separation (baseline) of the different receiving antennas. In radio astronomy, baselines as large as the earth itself have been used. The present invention contemplates baselines on the order of 500 meters.

The interferometers used in radio astronomy are primarily used to accurately determine the positions of very distant objects. In such systems response time is not a limiting factor, i.e., the signals can be recorded on magnetic tape for later analysis. In the case of real time tracking systems, however, response time is a very important consideration. One of the major problems of using the signal handling as taught in the prior art is that the time required to do the signal processing would be too long to permit real time tracking of a plurality of objects.

It is therefore an object of the present invention to provide an interferometer based radar system with improved signal handling capabilities so that the signals from individual objects in a cluster can be processed in real time.

It is another object of this invention to provide high enough resolution to be able to distinguish between individual objects of a cluster and to determine the three-dimensional positions of the individual objects.

SUMMARY OF THE INVENTION

The present invention provides a radar system that is capable of providing real time tracking of a plurality of individual objects in a cluster, with a resolution for each object of one meter at a range of 500 kilometers.

In one preferred embodiment, the radar system of the present invention comprises means for producing in real time reference information indicative of the position of a reference point associated with the mean position of the objects, and means for producing in real time displacement information indicative of the relative position of each object with respect to the reference point.

The displacement information may be produced by an interferometer system that comprises a central receiver, a pair of first satellite receivers positioned on opposite sides of the central receiver along a first axis that passes through the central receiver, and a pair of second satellite receivers positioned on opposite sides of the central receiver along a second axis that passes through the central receiver and that is inclined with respect to the first axis. The displacement information indicates the position of each object with respect to a virtual coordinate system having one axis coincident with a line from the central receiver to the reference point.

The radar system comprises a transmitter that is operative to transmit a series of transmitted pulses of radiant energy towards the cluster such that each reflective object responds to each transmitted pulse by producing a return pulse. Each receiver includes means for determining the relative phase and the relative arrival time of each return pulse. A reference means associated with the interferometer system generates a phase reference signal that is transmitted to all receivers. Each receiver determines the relative phase of each return pulse by comparing the phase of the return pulse to the phase of the reference signal, and produces corresponding pulse phase data for that return pulse. Each receiver also transmits the phase reference signal back to the reference means, and the reference means includes phase comparator means for comparing, for each receiver, the phase of the phase reference signal transmitted to that receiver to the phase of the phase reference signal returned from that receiver, and for generating corresponding phase correction data for that receiver. A processing unit associated with the interferometer system may receive the pulse phase data from each receiver, and processes the pulse phase data and the phase correction data in real time to produce information indicative of the position of each object with respect to the virtual coordinate system.

In a further aspect of the invention, the reference means includes means for superimposing a timing signal on the phase reference signal. The timing signal is detected by each receiver and used to determine the relative arrival time of each return pulse. The phase reference signal may comprise a train of pulses at a constant frequency, and the timing signal may comprise the deletion of certain ones of said pulses.

In a further aspect of the invention, the reference point is the mean position of the objects that form the cluster, and the central receiver comprises a monopulse receiver that is adapted to produce a cluster signal indicative of the mean position of the objects. In this embodiment, the means for producing reference information comprises a cluster tracking unit that is operative to receive the cluster signal from the monopulse receiver and produce in real time signals indicating the mean position of the objects with respect to the first and second axes.

In a further aspect of the invention, each receiver determines the relative phase and the relative arrival time of each return pulse and produces corresponding pulse phase data and pulse time data. The pulse phase data and pulse time data is received by a processing unit that produces displacement information therefrom in real time. The processing unit comprises a plurality of first processors, one first processor for each receiver. Each first processor receives the pulse phase and pulse time data from its associated receiver and produces corresponding virtual phase and virtual time data. The virtual phase and virtual time data corresponds to the relative phases and relative arrival times of the pulses at a virtual receiver that is located by projecting the receiver onto a virtual plane normal to the axis from the central receiver to the reference point. The processing unit may also comprise a plurality of second processors, each second processor being operative to receive the virtual phase and virtual time data for a single object, and for processing the virtual data in real time to produce the displacement information for the object.

In a further aspect of the invention, the transmitter and each receiver include an antenna, and the reference information used to control the orientation of the antennas such that they are directed towards the reference point.

These and other features and advantages of the invention will be apparent in the detailed description and claims to follow, taken in conjunction with the accompanying drawings.

BRIEF DESCRIPTION OF THE DRAWINGS

FIG. 1 is a diagram showing the positions of the receivers and transmitter according to one embodiment of the present invention;

FIG. 3 is a diagram illustrating the relationship between the ground plane and the virtual plane;

DETAILED DESCRIPTION OF THE DRAWINGS

FIG. 1 illustrates one preferred embodiment of the radar system of the present invention. The system comprises a centrally located receiver $A_0$, satellite receivers $A_1$ and $A_2$ located along an axis (X) that passes through receiver $A_0$, and satellite receivers $A_3$ and $A_4$ located along a second axis (Y) that also passes through receiver $A_0$. The X and Y axes are preferably perpendicular to one another, and both lie in a plane herein termed the "ground plane." The system also comprises transmitter $A_5$ that may be located at any convenient location. The transmitter and each receiver include a conventional parabolic antenna mounted on a gimballed support mechanism that allows the antenna to be rotated about 360° of azimuth and through elevation angles from 0° (horizontal) to 90° (vertical).

During operation of the radar system, transmitter $A_5$ radiates a series of pulses of RF energy toward a distant cluster of objects. Such transmitted energy is indicated schematically by line 12 in FIG. 1. Each pulse of RF energy is reflected by each object in the cluster, and the reflections from each object are received by receivers $A_0$ through $A_4$. Reflected energy is indicated schematically by line 14 for receiver $A_0$. Receiver $A_0$ is preferably a monopulse receiver, and the signal received at $A_0$ is used to determine the position of the cluster as a whole. Such cluster position information is used to keep the antennas of receivers $A_0$ through $A_4$ and of transmitter $A_5$ directed towards the cluster.

Receivers $A_0$ through $A_4$ are components of an interferometer system that is capable of accurately determining the position of each object in the cluster. Signals detected at receivers $A_1$, $A_0$ and $A_2$ are used to determined the position of each object with respect to the X axis, and signals detected at receivers $A_3$, $A_0$ and $A_4$ are used to determine the position of each object with respect to the Y axis. The interferometer system will be described in greater detail below. Receiver $A_0$ could of course be replaced by two receivers, one to provide cluster tracking and one to form part of the interferometer system. However, using a single receiver to perform both these functions will generally be more efficient.

Figure 2:
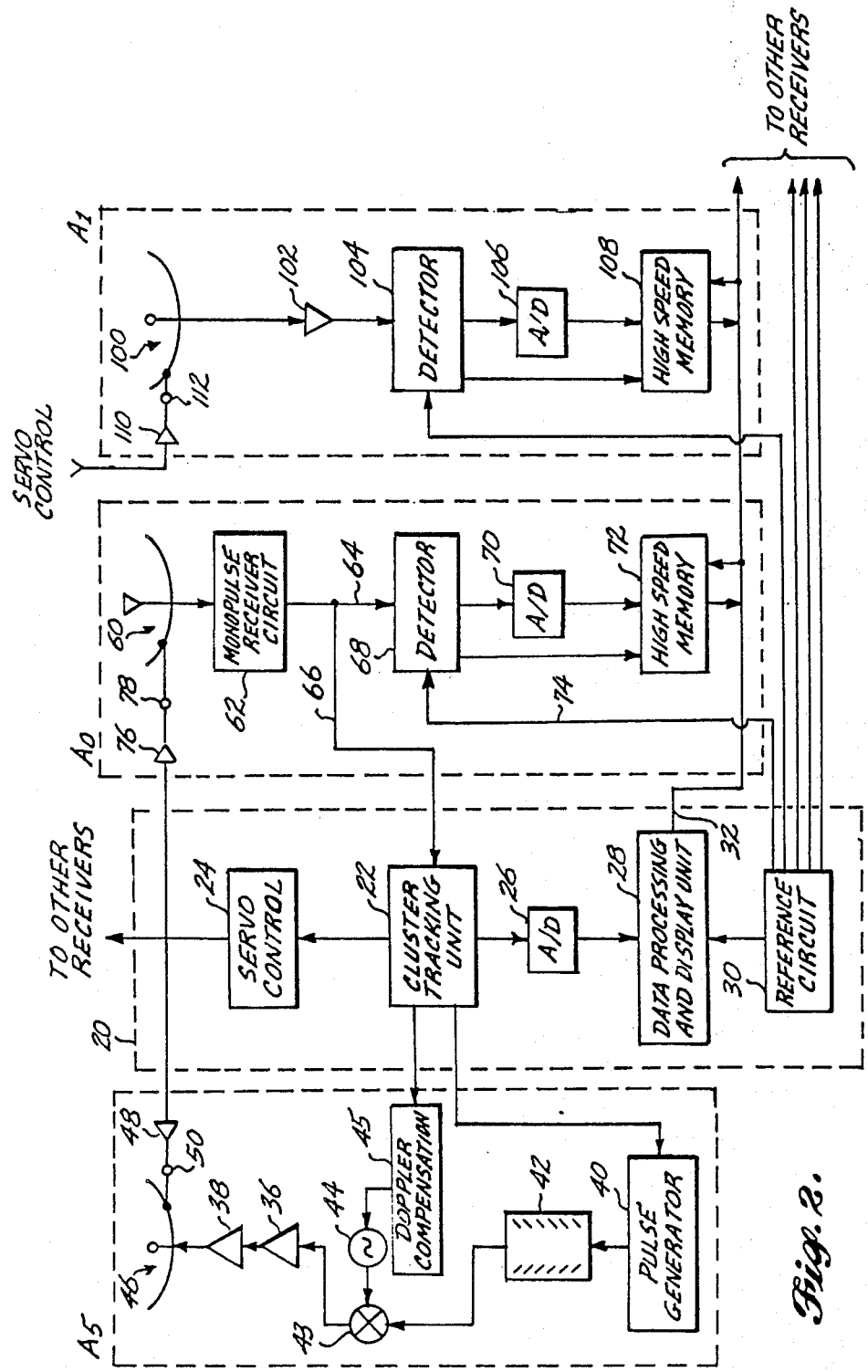
FIG. 2 is a system block diagram of the present invention.

Referring now to FIG. 2, a block diagram of the system of the present invention is shown comprising central station 20, monopulse receiver $A_0$, transmitter $A_5$, and satellite receiver $A_1$. Satellite receivers $A_2$, $A_3$ and $A_4$ (not shown) are identical to receiver $A_1$. Central station 20 may be located at the same site as receiver $A_0$. Receiver $A_0$ includes antenna 60 and four segment monopulse receiver circuit 62. The sum channel 64 from receiver circuit 62 is passed to detector 68, while both sum and difference channels 66 from receiver circuit 62 are passed to cluster tracking unit 22 at central station 20. Cluster tracking unit 22 determines the range, azimuth and elevation of the cluster, as well as the time derivative of each of these quantities. Azimuth and elevation signals are passed to servo control 24, which generates correction signals which in turn are passed to all antennas in the system. With respect to receiver $A_0$, the signals from servo control 24 are passed to servo motor control 78 through driver 76, and function to control the orientation of monopulse antenna 60 such that it always points towards the average object position in the cluster. Similar circuits are used for all other antennas, the circuit for antenna 46 of transmitter $A_5$ comprising driver 48 and servo motor control 50, and the circuit for satellite receiver $A_1$ comprising driver 110 and servo motor control 112.

Cluster tracking unit 22 determines the range, azimuth and elevation of the cluster by averaging the entire return signal provided by monopulse receiver circuit 62, as well as by time averaging such signals over a number of successive returns. Assuming that the cluster is traveling on a continuous (ballistic) path, such an averaging process allows a very accurate and continuous determination of the cluster position. After an initial determination is made of the rates of change of the cluster range, azimuth and elevation, tracking can be accomplished by adding a predetermined amount of change according to the trajectory defined by the time derivatives. Additional second order correction factors can be added if necessary. An initial calculation to establish trajectory parameters can be done when the cluster rises above the horizon, or, alternatively, can be provided by a separate tracking system located at another site.

Transmitter $A_5$ comprises a pulse generator 40 that generates a series of IF pulses whose frequency, repetition rate and width depend on the particular application. In a preferred embodiment, the pulse repetition rate is controlled by cluster tracking unit 22 based upon the range of the cluster, such that the transmitter is not transmitting during the time intervals in which return pulses are received. The pulses generated by pulse generator 40 are passed to SAW (surface acoustic wave) filter 42 which expands the duration of the pulses by a factor of up to 1,000 or more. The expanded pulses are passed to mixer 43 which mixes the expanded pulses with a signal supplied by frequency controlled oscillator 44. The frequency of the signal produced by frequency controlled oscillator 44 is controlled by doppler compensation circuit 45 such that the pulses returned after reflection from the objects have a predetermined frequency. Doppler compensation circuit 45 receives object velocity information directly from cluster tracking unit 22 at central station 20. The signal produced by mixer 43 is input into preamplifier 36, the preamplifier including appropriate filter circuitry to extract only the upper sideband of the mixed signal. Klystron 38 boosts the power of the preamplified signal to a level up to about 1 MW, and it is then radiated towards the cluster by antenna 46.

Referring again to receiver $A_0$, the sum channel 64 from monopulse receiver circuit 62 is passed to detector 68. Detector 68, described in greater detail below, includes a SAW filter that compresses the pulses by a factor equal to expansion produced by SAW filter 42, and further provides, for each return pulse, analog signals representing the phase shift and amplitude of the pulse and a digital signal representing the pulse arrival time. The analog signals are digitized by analog to digital converter (A/D) 70, and the resulting digital signals, together with the digital arrival time signal from detector 68, are stored in high speed memory 72. In a similar manner, the signal from antenna 100 of receiver $A_1$ is amplified by RF preamplifier 102 and then passed to detector 104. Detector 104 provides an analog signal indicating the phase of each return pulse and a digital signal representing its arrival time. The analog signal is digitized by A/D 106, and the resulting digital signal, together with the digital arrival time signal from detector 104, are stored in high speed memory 108. Similar information is produced and stored by the other satellite receivers. For each receiver $A_0$ through $A_4$, the phase of each return pulse is determined by comparing the pulse phase with the phase of a reference signal generated by reference circuit 30 at central station 20, in a manner to be described. The amplification provided by RF preamplifier 102 for receiver $A_1$, is provided by monopulse receiver circuit 62 for receiver $A_0$. The gain provided by the monopulse receiver circuit and the RF preamplifier are selected to compensate for signal loss in the input stages of the associated detectors.

Central station 20 includes a data processing and display unit 28 for collecting, processing and displaying the object and cluster information received from various components in the system. In particular, data processing and display unit 28 receives object center information (range, azimuth, elevation and derivatives thereof) from cluster tracking unit 22 via A/D 26, phase reference information from reference circuit 30, and information concerning each return pulse at each receiver from the high speed memory units of each receiver via signal path 32. Data processor and display unit 28 also sends a gating signal to the high speed memory units of each receiver over signal path 32. Details of these processes are described below.

For the purpose of illustration, representative object and system parameters will now be described, it being understood that such parameters are representative and are not intended to limit the invention described herein. FIG. 3 illustrates an object cluster 120 and receivers $A_0$, $A_1$ and $A_2$, the other satellite receivers and transmitter $A_5$ being omitted for clarity. Object cluster 120 includes up to a hundred individual objects, one such object being indicated by numeral 124. The diameter (D) of the cluster is assumed to be on the order of 5 kilometers, and it is further assumed that all objects are moving with a cluster velocity V up to 10,000 meters per second and that the range from receiver $A_0$ to the cluster is about 500 kilometers. To cover a 5 km object at a 500 km range, the antennas of the transmitter and the receivers must have beam widths of about 0.5°. It will further be assumed that it is necessary to provide object resolution of about 1 meter, which at 500 km corresponds to 0.002 milliradian or 0.41" in angle. Such an angular resolution is about equal to that obtainable with a conventional astronomical observatory.

A monopulse radar receiver can provide angular resolutions of about one percent of its antenna beam width. It is therefore apparent that for a beam width of 0.5°, monopulse receiver circuit 62 will be incapable, by more than an order of magnitude, of resolving individual objects in the cluster. In addition, the resolution of one percent of the beam width is valid only near the beam center, and not near the edges of the beam. The function of the monopulse receiver is therefore to track the cluster as a whole, and individual object tracking is provided by the interferometer system to be described.

The pulses radiated by antenna 46 of transmitter $A_5$ (FIG. 2) will be assumed to have a frequency centered about 8.5 GHz, and a repetition rate of 500 pulses per second. At 8.5 GHz, an antenna with a beam width of 0.5° would have a diameter of about 140 wavelengths or 4.2 meters. It will further be assumed that pulse generator 40 produces a series of pulses, each of which has a 10 nanosecond duration and an IF frequency of 500 MHz, and that SAW filter 42 expands such 10 nanoseconds pulses by a factor of 1,000. The expanded pulses are then combined by mixer 43 with a carrier signal produced by frequency controlled oscillator 44, the carrier frequency being 8.5 GHz$\pm f_D$ where $f_D$ is the doppler correction frequency determined by doppler compensation circuit 45 based on a cluster radial velocity signal provided by cluster tracking unit 22. Since preamplifier 36 selects only the upper sideband of the output of mixer 43, the result is that the signal radiated by transmitter $A_5$ has a frequency of 8.5 GHz$\pm f_D$, and the signal reflected from the object and detected by the receivers has a frequency of 8.5 GHz.

The radar system of the present invention determines the direction of each object in a cluster of objects by means of an interferometer system that can be generally described by reference to FIG. 3. In FIG. 3, the X axis passes through receivers $A_1$, $A_0$ and $A_2$ (as in FIG. 1), and the Z axis is vertical, perpendicular to the ground plane defined by receivers $A_0$ through $A_4$. Assume that object 124 is in the X-Z plane and has a direction defined by elevation angle $\theta$. It is required to measure $\theta$ to an accuracy of 0.002 milliradians (1 meter at 500 km). This measurement is performed by measuring the phase difference, for a given pulse returned from object 124, between receivers $A_0$, $A_1$ and $A_2$. In FIG. 3, lines 126 represent the wave fronts of such a pulse. The wave fronts are perpendicular to line 128 from the object to the receivers. Line 130 represents a wave front at the moment it reaches receiver $A_0$. It is clear that the phase difference $\phi$ between receivers $A_1$ and $A_2$ for a given return pulse from object 124 is:

$$\phi = \frac{2\pi L \cos\theta}{\lambda} \quad (1)$$

where L is the distance along the X axis between receivers $A_1$ and $A_2$, and $\lambda$ is the wavelength of the radiation (about 3.5 cm at 8.5 GHz). This relationship can be used to determine the required base length L for a given application.

Conventional IF and RF circuitry is capable of providing phase stabilities on the order of 3° electrical, corresponding to a signal to noise ratio of about 26 db. Thus to optimize performance, the system can be designed so that the required resolution (1 meter at 500 km) corresponds to a phase difference of 3° electrical or 1/120 wavelength. By differentiating equation 1, it can be seen that the magnitude of the phase change produced by a small change in $\theta$ is $2\pi L \sin\theta/\lambda$. Thus for elevation angles near 90° (overhead objects), 0.002 milliradians corresponds to a 3° phase change for a base length L of about 4,000 wavelengths, or about 140 meters. To maintain such accuracy at lower elevation angles, longer base lengths would be required. If it was expected that objects would generally approach the radar system from a given direction (e.g., along the X axis), then it would be preferable to make the X axis longer than 4,000 wavelengths by a factor of 3-5, to maintain optimum resolution for low elevation clusters. For example, in such a case, receivers $A_1$ and $A_2$ might be spaced 420 meters apart, while receivers $A_3$ and $A_4$ would be spaced apart by 140 meters.

Receiver $A_0$ provides two important functions in the system of the present invention. As has already been described, it provides cluster tracking information that is used to keep the antennas of the transmitter and of all receivers directed towards the cluster. In addition, phase data generated by receiver $A_0$ is used in the interferometer system of the present invention to resolve the phase ambiguities inherent in the signals from the satellite receivers. Referring to FIG. 3 and to the example given above, if an angular change of 0.002 milliradian in angle $\theta$ produces a 3° change in the phase difference between receivers $A_1$ and $A_2$, then an angular change of 0.002 × 120 or 0.24 milliradians would produce a 360° phase change. Since return pulses from a 5 km cluster at 500 km would approach the receivers over a 10 milliradian span of angles, it is clear that the base length required to provide the necessary resolution will also produce significant phase ambiguities.

Such phase ambiguities can be eliminated by positioning a center receiver a small integral number of wavelengths from the midpoint between the outer receivers. Receiver $A_0$ serves as such a center receiver for satellite receivers $A_1$ and $A_2$, and for satellite receivers $A_3$ and $A_4$ L as well. Referring to FIG. 3, assume that the distance along the X axis between receivers $A_1$ and $A_0$ is $n\lambda$, and that the distance along the X axis between receivers $A_0$ and $A_2$ is $(n+k)\lambda$. If the phases of a pulse received from object 124 at receivers $A_1$, $A_0$ and $A_2$ are $\phi_1$, $\phi_0$ and $\phi_2$, respectively, then the following equations may be written:

$$\phi_1 - \phi_2 = \Delta\phi_{12} = 2\pi(2n+k)\cos\phi \quad (2)$$

$$\phi_1 - \phi_0 = \Delta\phi_{10} = 2\pi(n)\cos\phi \quad (3)$$

$$\phi_0 - \phi_2 = \Delta\phi_{02} = 2\pi(n+k)\cos\theta \quad (4)$$

$$\Delta\phi_{02} - \Delta\phi_{10} = 2\pi(k)\cos\theta \quad (5)$$

If n is equal to 1950 and k is equal to 100, then the total base length between receivers $A_1$ and $A_2$ will be 4,000 wavelengths, and the system will have the required resolution as described above. The phase difference $\Delta\phi_{12}$ will then produce a fine but ambiguous determination of object direction (i.e., of elevation angle $\theta$). I may be appreciated, however, that the subtracted phase difference set forth in equation (5) undergoes one nonambiguous set of phase differences over a larger range of angle $\theta$, provided that the parameter k is sufficiently small. Since the entire cluster spans approximately 10 milliradians, values of k up to about 100 will provide the required coarse but unambiguous determination of $\theta$ with respect to line 128, whose direction is known as described below. Thus, by measuring the phase of a return pulse at receivers $A_1$, $A_0$ and $A_2$, an accurate and unambiguous determination of object direction with respect to the X axis can be made. A similar determination can be made with respect to the Y axis by measuring the phase of a return pulse at receivers $A_3$, $A_0$ and $A_4$.

For some applications, 3 antennas per axis will be insufficient to provide the required resolution in addition to an unambiquous determination of phase. This would be the result, for example, for the tracking of objects in a cluster having an angular extent significantly exceeding 0.5°. In such a case, it would be necessary to extend the principles set forth above by providing additional receivers along the X and Y axes.

In a conventional interferometer system, calculations analogous to equations (2) through (5) above, expanded to include azimuth as well as elevation, would have to be made for each of up to 100 objects for each pulse (e.g., every 2 milliseconds). The resulting volume of calculations would be impractical with existing real time data processing systems. An important aspect of the present invention, therefore, is the dramatic reduction of the amount of calculation required through the use of a "virtual plane" different from the ground plane defined by the receivers.

The virtual plane is that plane passing through receiver $A_0$ that is perpendicular to a line from receiver $A_0$ to a reference point associated with the cluster. The reference point may either be the average position of the cluster, as determined by monopulse receiver $A_0$, or the position of a particular object in the cluster, or any other convenient point in the vicinity of and moving with the cluster. In FIG. 3, if object 124 is taken to be coincident with the center of the cluster, and if such center is taken as the reference point, then the virtual plane would be the plane represented by line 130 passing through receiver $A_0$ perpendicular to line 128. It should be evident that other planes perpendicular to line 128 could serve as the virtual plane, but the plane represented by line 130 will be used herein for convenience.

The reduction in calculations by use of the virtual plane is based upon the fact that the orientation of the virtual plane, and the relationship of each receiver to the virtual plane, must be calculated only once for the entire cluster for each transmitted pulse. The orientation of the virtual plane with respect to the ground plane is determined by data processing and display unit 28 (FIG. 2). In the case where the average object position is taken to be the reference point, then the orientation of the virtual plane is simply determined from the azimuth and elevation of the object center, such information being determined by cluster tracking unit 22 based on signals supplied by monopulse receiver $A_0$. Once the two angles which define the orientation of the virtual plane with respect to the ground plane are known, then each receiver $A_1$ through $A_4$ can be projected onto the virtual plane, and subsequent object-by-object calculations can be made with respect to the "virtual" receivers so projected. This process can be illustrated in two dimensions by reference to FIG. 3. In FIG. 3, the orientation of virtual plane 130 with respect to the X axis (ground plane) is defined by angle $\theta$. Once angle $\theta$ is known, it is a simple matter to determine the distance $A_1 A_1'$ between receiver $A_1$ and virtual receiver $A_1'$. The distance $A_2 A_2'$ may similarly be determined. From such distances, the phase and arrival time differences between actual and virtual receivers can be determined, and such phase and time differences can be used to adjust the phase and time differences measured for all objects in the cluster. The distances $A_1'A_0$, and $A_0 A_2'$ can similarly be determined, and used to calculate, the effective base lengths of the interferometer consisting of receivers $A_1'$, $A_0$ and $A_2'$. Thus, by calculating a single coordinate transformation for the cluster, all subsequent object-by-object calculations can be carried out with respect to the virtual receivers in the transformed system. Since the entire cluster spans an angle of only 10 milliradian, the angle between the virtual plane and any given object element will be $\pi/2 \pm 0.005$ radians. Within such limits, the calculation of sine and cosine values can accurately be approximated by simpled expressions which require only a fraction of the computation time otherwise required for trigonometric functions. For example, for a small angle $\epsilon$:

$$\cos(\pi/2+\epsilon)=\sin(-\epsilon)=-\epsilon \qquad (6)$$

For a typical microprocessor such as the Rockwell R68000, the number of clock cycles required for common mathematical operations are given in Table 1.

TABLE 1

| Function | Clock Cycles |
| --- | --- |
| Data transfer to/from memory | 4–20 |
| Shift/rotate | 6–8 |
| Add/subtract | 8–12 |
| Multiply | 70 |
| Divide | 140–160 |
| Sine/cosine | 1200 |

It is readily apparent from this table that significant savings in computation time are achieved by carrying out calculations in the coordinate system based on the virtual plane. In particular, computation times can be reduced by a factor of 100 or more by substituting additions and subtractions for sine and cosine operations.

For the general three-dimensional case, assume that the elevation angle $\theta$ is defined to be the angle between line 128 and the X-Y plane, and that the azimuth angle $\alpha$ is defined to be the angle between the X-axis and the projection of line 128 onto the X-Y plane (see FIG. 1). In such a case, if $x_i$ represents the distance between receiver $A_1$ or $A_2$ and receiver $A_0$, and if $y_i$ represents the distance between receivers $A_3$ or $A_4$ and receiver $A_0$, then the respective distances $\Delta R_x$ and $\Delta R_y$ between these receivers and the virtual plane are given by:

$$\Delta R_x = x_i \cos\alpha \cos\theta \qquad (7)$$

$$\Delta R_y = y_i \sin\alpha \cos\theta \qquad (8)$$

and the distances of the receivers in the virtual plane from receiver $A_0$ are given by:

$$x'_i = (x_i^2 - \Delta R_x^2)^{0.5} \qquad (9)$$

$$y'_1 = (y_i^2 - \Delta R_y^2)^{0.5} \qquad (10)$$

These calculations will have to be performed only once for the entire cluster for each transmitted pulse. As described below, the calculations of equations (7) through (10) are performed by separate processors associated with each receiver. The quantities $x_i'$ and $y_i'$ represent the position of the virtual receivers in a coordinate system X'Y'Z', where the Z' axis points along line 128 and the X' and Y' axes lie in the virtual plane. The X' axis passes through virtual receivers $A_1'$ and $A_2'$, and the Y' axis passes through virtual receivers $A_3'$ and $A_4'$.

Figure 4:
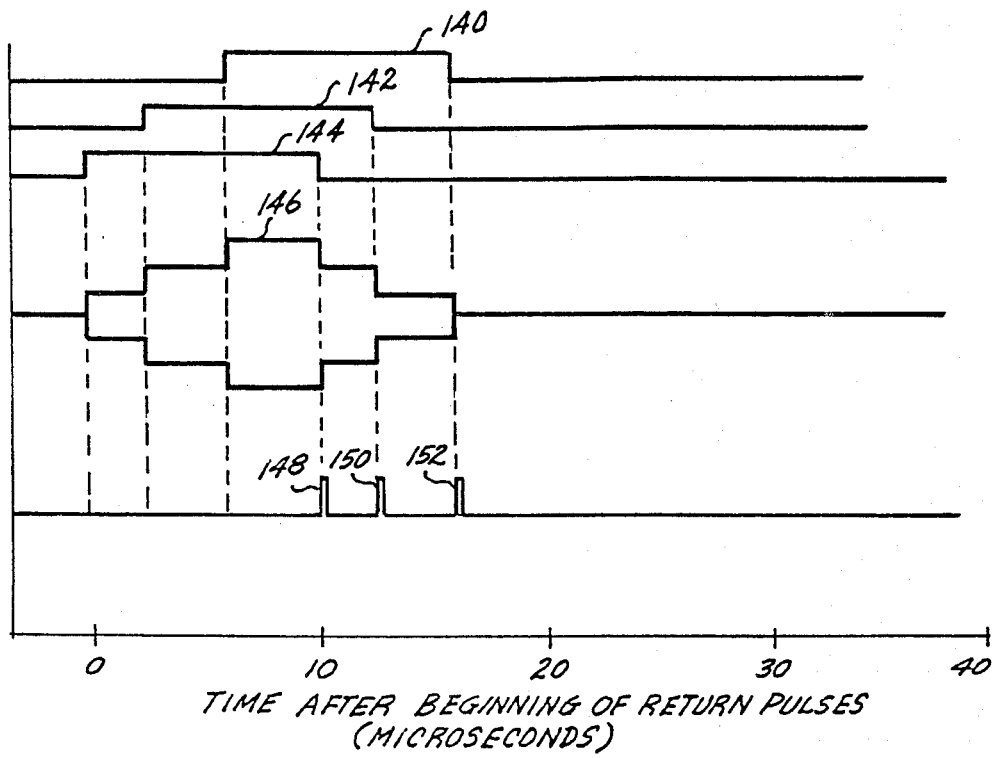
FIG. 4 is a graph showing the processing of composite, expanded pulses to produce compressed pulses.
Figure 6:
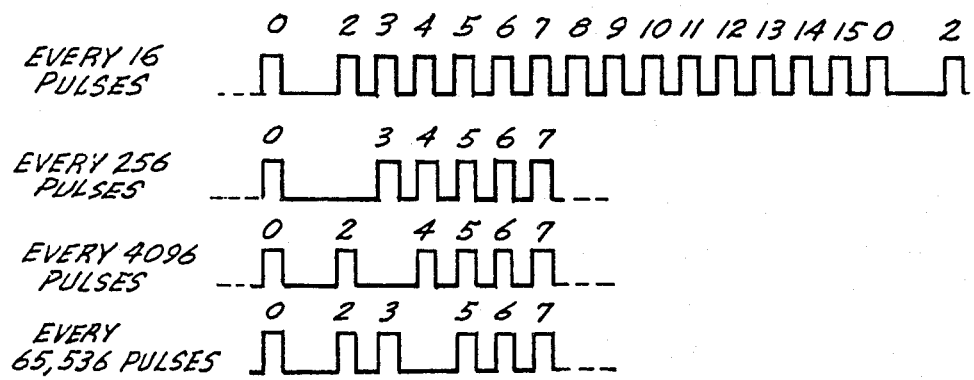
FIG. 6 is a diagram illustrating the addition of timing information to the subcarrier signal.
Figure 5:
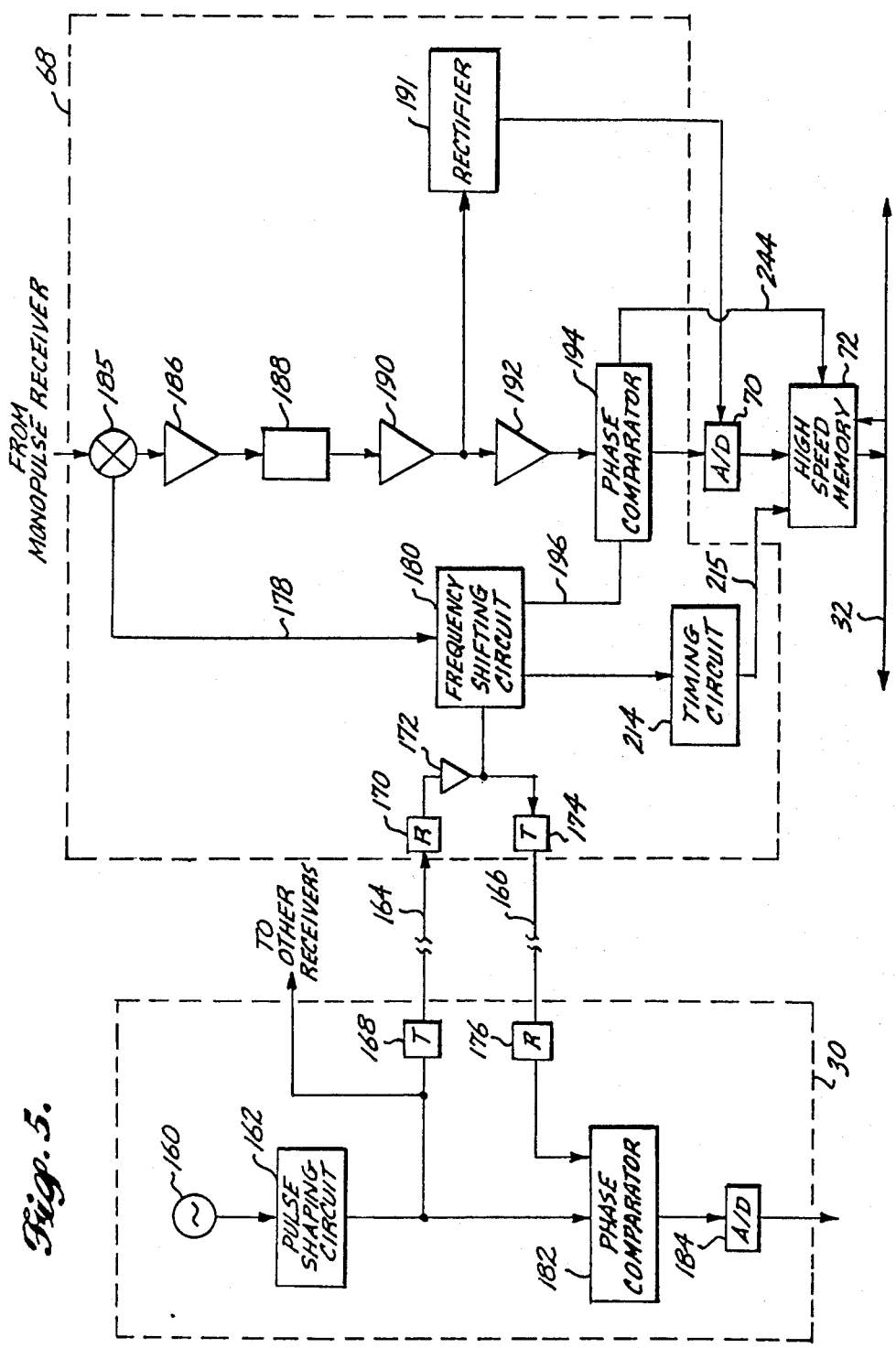
FIG. 5 is a block diagram of the reference circuit and detectors of the present invention.

The technique by which phase information is obtained for the return pulses can be understood with reference to FIGS. 2, 4 and 5. As previously described, pulse generator 40 (FIG. 2) of transmitter $A_5$ produces 10 nanosecond pulses which are expanded by SAW filter 42 by a factor of 1,000 or more. For the assumed expansion factor of 1,000, each pulse transmitted from antenna 46 has a duration of 10 microseconds. FIG. 4 illustrates the return pulses for the simple case in which there are only three objects in a cluster. In FIG. 4, expanded pulses 140, 142 and 144 represent the separate returns from three individual objects, and signal 146 represents the envelope of the composite return from the cluster for a single transmitted pulse. Signal 146 represents the signal actually input to detectors 68 and 104 in FIG. 2. Each detector includes a SAW filter which exactly matches SAW filter 42 of transmitter $A_5$. By passing the return signal through such a SAW filter, composite signal 146 is broken down into compressed pulses 148, 150 and 152, which represent the returns from individual objects. The detectors then determine the arrival time and phase of each compressed pulse. Detector 68 of monopulse receiver $A_0$ also determines the amplitude of each compressed pulse. Digital signals representing these values are then sent to data processing and display unit 28, as previously described. The data processing and display unit correlates the pulse information from the several receivers by sequence (time of arrival), such that for each return pulse from a given object, the following information is available for analysis:

1. The time that the pulse arrived at each receiver.
2. The relative phase of the pulse at each receiver.
3. The amplitude of the pulse at receiver $A_0$.

As previously described, to achieve an angular resolution of 1 meter at 500 km, the phase difference for a given pulse between different receivers is preferably known to an accuracy of 3° electrical. To achieve such accuracy, it is necessary to provide a phase reference, stable to 1/120 wavelength, at a number of receivers separated from one another by a distance of several thousand wavelengths. There are a number of possibilities for transmitting a phase reference signal between the receivers. A signal could be transmitted through the air, through a coaxial cable, through a waveguide, or through a fiberoptics cable. Signals transmitted through the air are subject to air turbulence, thermal gradients and multipath disturbances, and are generally not preferred for the purposes of the present invention. Coaxial cables have high losses at the frequencies of interest, and the use of coaxial cables would, in many instances, require additional amplifiers that themselves would introduce phase instabilities. Waveguides have lower loss coefficients, but are expensive to install. Fiberoptics transmission does not include any of the above drawbacks, and with current technology is capable of providing signal modulation and transmission at up to 2–3 GHz. Fiberoptics transmission is therefore the preferred method of transmitting phase reference signals to and from the receivers of the present invention.

FIGS. 5 through 10 illustrate further details and features of detector 68 and related components of receiver $A_0$. Unless otherwise noted, these details and features also apply to the corresponding components of receivers $A_1$ through $A_4$. Referring now to FIG. 5, the phase reference signal is generated by reference circuit 30 located at a central station 20. Reference circuit 30 comprises oscillator 160 that produces a signal at a subcarrier frequency of 2 GHz. Pulse shaping circuit 162 converts this signal into a 2 GHz square wave subcarrier signal, and also superimposes timing information on the pulse train as described below. The 2 GHz subcarrier signal is then transmitted to detector 68 at monopulse receiver $A_0$ by means of a fiberoptics system that includes fiberoptics cables 164 and 166, transmitting diodes 168 and 174, photomultiplier receivers 170 and 176, and amplifier 172. The subcarrier signal is converted by transmitting diode 168 into a 2 GHz light signal, which signal is transmitted through fiberoptics cable 164 to photomultiplier receiver 170. Photomultiplier receiver 170 reconverts the light signal to an electrical signal which is amplified by amplifier 172. The amplified subcarrier signal is received by frequency shifting circuit 180, and is also reconverted by transmitting diode 174 into a light signal which is transmitted through cable 166 back to photomultiplier receiver 176 at reference circuit 30. Phase comparator 182 determines the phase difference experienced by the subcarrier signal in passing through the fiberoptics system between transmitting diode 168 and photomultiplier receiver 176. Fiberoptics cables 164 and 166 are preferably underground and constructed to be as identical as possible. For example, the cables are the same length, cut from the same length of fiber, and positioned adjacent one another throughout their length. It can then be assumed that the phase difference caused by transmitting the subcarrier signal from reference circuit 30 to detector 68 is the same as the phase difference caused by the return transmission. The total phase difference measured by phase comparator 182, divided by 2, is therefore the phase difference of the subcarrier signal between the reference circuit and the detector. A signal representing the total phase difference is passed from phase comparator 182 to A/D 184, and the resulting digital signal is then passed to data processing and display unit 28. It is to be understood that FIG. 5 illustrates the fiberoptics system, phase comparator, and analog-to-digital converter for receiver $A_0$ only, and that identical components are provided for each of the other receivers $A_1$ through $A_4$. By such means, the relative phase of the subcarrier signal throughout the radar system can always be determined and maintained to a high degree of accuracy.

The fiberoptics system is also used to transmit a time reference signal from reference circuit 30 to the receivers. Pulse shaping circuit 162 encodes the subcarrier signal phase train in the manner indicated in FIG. 6. The pulse shaping circuit deletes every 16th pulse (e.g., pulse 1) from the subcarrier pulse train. Every 256th pulse, the pulse shaping circuit deletes pulse 2 in addition to pulse 1. Every 4,096 pulses, the pulse shaping circuit deletes pulses 1 and 3, and every 65,536 pulses, the pulse shaping circuit deletes pulses 1 and 4. This technique could be extended to longer repetition patterns, if necessary. However, at 2 GHz, the pattern indicated in FIG. 6 repeats itself every 65,536 pulses, or every 32.8 microseconds, a period of time long enough to cover the period of time in which pulses would return from a object area 5 kilometers in diameter.

Frequency shifting circuit 180 passes the encoded subcarrier signal without modification to timing circuit 214. Timing circuit 214 detects the timing patterns indicated in FIG. 6, and produces a digital output signal that is used to determine the arrival times of received pulses. Since the received return pulses will be received during an interval on the order of 30 microseconds, there are about 3,000 ten nanosecond time slots into which a given pulse can fall. Twelve bits (4,096 values) are therefore used to specify pulse arrival times, and timing circuit 214 monitors the timing patterns shown in FIG. 6 and produces such a 12-bit digital output signal, and increments the signal by one every 10 nanoseconds. As described below, this 12-bit signal is stored in high speed memory 72 each time a return pulse is detected.

Frequency shifting circuit 180 includes a frequency multiplier circuit which converts the 2 GHz subcarrier signal to an 8 GHz sine wave signal 178 which serves as the local oscillator signal for receiver 68. The phase of signal 178 is controlled to precisely match the phase of the 2 GHz subcarrier signal received by the frequency shifting circuit from the fiberoptics system. Mixer 185 combines signal 178 with the 8.5 GHz signal received from the antenna (via monopulse receiver 62 for receiver $A_0$ and via RF preamplifier 102 for satellite receivers), and passes the resulting 500 MHz IF signal to logarithmic amplifier 186. The logarithmic amplifier serves to decrease the required dynamic range in the detection circuitry. The amplified IF signal is then passed to SAW filter 188, which converts the composite expanded return pulses into a series of individual compressed pulses, as described above in connection with FIG. 4. The compressed pulses are then further amplified by IF amplifier 190, and then passed to limiter 192, which provides an output signal having a defined and substantially constant maximum amplitude. The amplified and limited IF pulse signals are then input to phase comparator 194. For receiver $A_0$, the signal from IF amplifier 190 is also input to rectifier 191. For each pulse, rectifier 191 produces an analog output signal representing the amplitude of the pulse, which analog signal is digitized by A/D 70. Satellite receivers $A_1$ through $A_4$ need not include rectifier 191, inasmuch as the amplitude of a given pulse will not vary significantly between receivers.

Frequency shifting circuit 180 also includes a frequency divider circuit which divides the 2 GHz subcarrier frequency by four, to produce 500 MHz sine wave reference signal 196. As with signal 178, the phase of reference signal 196 is controlled to precisely match the phase of the 2 GHz subcarrier signal received by the frequency shifting circuit from the fiberoptics system, such that signal 178 and reference signal 196 are always precisely in phase. For each compressed pulse (e.g., each of pulses 148, 150 and 152 in FIG. 4), phase comparator 194 compares the phase of the pulse with the phase of reference signal 196, and produces a difference signal that is digitized by A/D 70. Phase comparator 194 also produces trigger signal 244 each time that a pulse is detected. Trigger signal 244 causes high speed memory 72 to load the digitized phase difference and amplitude signals from A/D 70, as well as the time signal from timing circuit 214. Thus the loading of high speed memory 72 occurs during the approximately 30 nanoseconds interval in which return pulses are received from a 5 km cluster. The phase difference, amplitude and timing data are then transmitted to the central station over signal path 32 during the 2 millisecond interval before the next group of return pulses are received.

Figure 7:
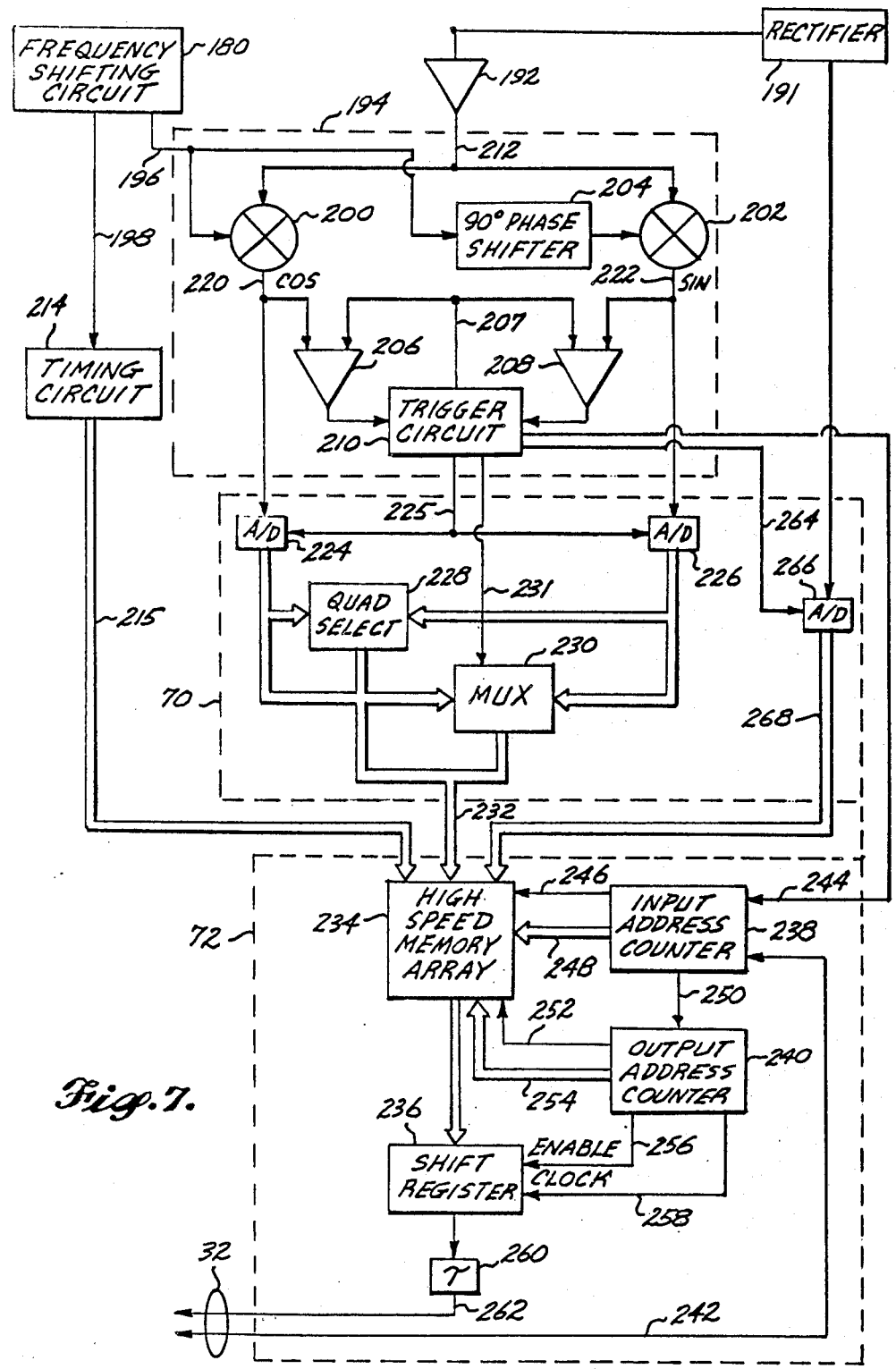
FIG. 7 is a block diagram showing the phase comparator, A/D, and high speed memory of a receiver of the present invention.
Figure 8:
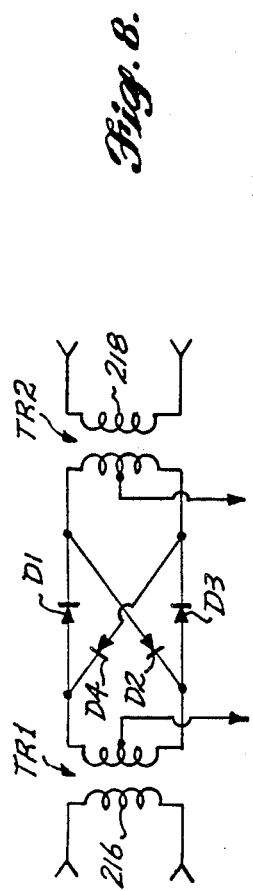
FIG. 8 is a circuit diagram of a mixer of the type used in the phase comparator of the present invention.
Figure 9:
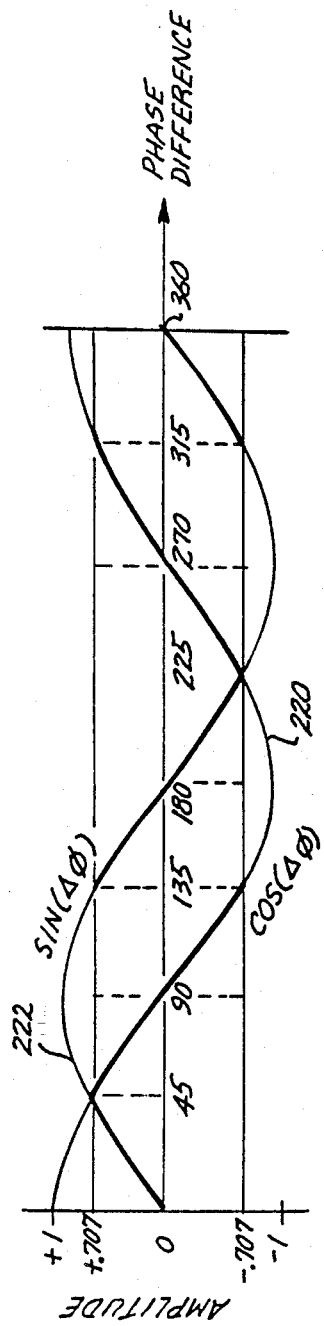
FIG. 9 is a graph showing the sine and cosine phase difference signals over a 360° range; and, FIG. 10 is a block diagram illustrating the data processing and display circuit for use in the present invention.

The construction and operation of phase comparator 194, A/D 70 and high speed memory 72 are illustrated in greater detail in FIGS. 7-9. Referring initially to FIG. 7, phase comparator 194 comprises doublebalanced mixers 200 and 202, 90° phase shifter 204, comparators 206 and 208, and trigger circuit 210. Each of the double-balanced mixers 200 and 202 receives two input signals having the same amplitude and frequency, and produces an output signal proportional to the cosine of the phase difference between its two input signals. The first input signal 212 to the mixers consists of the compressed pulses from limiter 192, while the second input signal to the mixers is provided by reference signal 196. Reference signal 196 is applied directly to the second input of mixer 200, and is applied through phase shifter 204 to the second input of mixer 202. Referring now to FIG. 8, mixers 200 and 202 each includes first and second transformers TR1 and TR2, with the signal applied to the first input of the mixer (e.g., signal 212) appearing across primary winding 216 of transformer TR1, and with the signal applied to the second input of the mixer (e.g., reference signal 196 for mixer 200) appearing across primary winding 218 of transformer TR2. The secondary windings of transformers TR1 and TR2 each include substantially symmetrical, oppositely-poled portions having a center tap. The terminations of the secondary windings of transformers TR1 and TR2 are interconnected by diodes D1, D2, D3 and D4 poled to conduct in a ring-like manner, and the output signal from the mixer is taken from the center taps of the secondary windings. It can be shown that as long as the first and second input signals to the mixer have the same frequency and substantially the same amplitude, the output signal has an amplitude which is proportional to the cosine of the phase difference between the first and second input signals. The first and second input signals to mixers 200 and 202 have substantially the same amplitude at times when phase measurements are to be made due to limiter 192, and have the same frequency, i.e., the intermediate frequency of 500 MHz. Accordingly, the output signal 220 of mixer 200 is proportional to the cosine of the phase difference between reference signal 196 and signal 212, whereas the output signal 222 of mixer 202, due to the 90° phase shift produced by phase shifter 204, is proportional to the sine of such phase difference.

The variation in output signals 220 and 222 from mixers 200 and 202 over a 360° range of phase difference is illustrated in FIG. 9. Each of these signals is applied to the signal inputs of high speed A/Ds 224 and 226, respectively. Suitable choices for A/Ds 224 and 226 are the TDC1025E1C converters available from TRW. Each of the A/Ds is responsive to trigger signal 225 from trigger circuit 210 to convert the analog signal 220 or 222 into a corresponding multibit digital signal. Trigger circuit 210 issues such trigger signal 225 in response to signals received from comparators 206 and 208. Referring to FIG. 9, it can be seen that for any phase difference between reference signal 196 and signal 212, either signal 220 or signal 222 will have an absolute value in excess of 0.707. Comparator 206 compares the absolute value of signal 220 with fixed reference signal 207 representing the 0.707 level, reference signal 207 being supplied by trigger circuit 210. In a similar manner, comparator 208 compares the absolute value of signal 222 with reference signal 207. Thus, when a return pulse signal is received by phase comparator 194, either comparator 206 or comparator 208 will issue a corresponding signal to trigger circuit 210, depending on the phase of the return pulse. Trigger circuit 210 will in turn issue trigger signal 225, causing A/D 224 and A/D 226 to sample signals 220 and 222, respectively. The digital signals produced by A/D 224 and A/D 226 are input into quadrant selection circuit 228 and multiplexer 230. Quadrant selection circuit 228 and multiplexer 230 in combination produce a 7-bit digital signal 232 which represents the phase difference between the received pulse and reference signal 196.

Signal 232 consists of 5-bits of magnitude data, produced by multiplexer 230, and 2-bits of quadrant data, produced by quadrant selection circuit 228. Referring to FIG. 9, it may be seen that sine signal 222 is substantially linear over the ranges of phase differences from 315° to 45° and from 135° to 225°. Similarly, cosine signal 220 is substantially linear over the ranges of phase differences from 45° to 135° and 225° to 315°. The substantially linear portions of signals 220 and 222 are emphasized in FIG. 9. These linearities are used to efficiently encode the phase difference. In particular, quadrant selection circuit 228 examines the digital sine and cosine signals to determine the quadrant of the phase difference (e.g., 315°–45°, 45°–135°, 135°–225° or 225°–315°), and encodes such quadrant information as a 2-bit output signal. At the same time, multiplexer 230 encodes the magnitude of the sine or cosine signal as a 5-bit digital word, the selection being based on channel select signal 231 received from trigger circuit 210. The result of this encoding is that 32 quantization steps are used to encode a 90° range of phase differences, to produce a system resolution on the order of 2.8°. The deviations between the linear portions of the sine and cosine functions and a straight line are sufficiently small so that for 5-bit encoding, the maximum error is less than one-half of the least significant bit. The resulting 5-bit amplitude signal from multiplexer 230 is combined with the 2-bit quadrant signal from quadrant selection circuit 228, and the resulting 7-bit signal 232 is passed to high speed memory 72.

Also passed to high speed memory 72 are amplitude signal 268 (for receiver $A_0$ only) and time signal 215. Amplitude signal 268 is an 8-bit signal produced by A/D 266 based upon the analog amplitude signal supplied by rectifier 191. The sampling of such analog signal is performed in response to trigger signal 264 supplied by trigger circuit 210 when a pulse has been detected by phase comparator 194. As described above, time signal 215 is a 12-bit, continuously changing signal which specifies the current time with respect to a 32.8 microsecond frame.

High speed memory 72 comprises high speed memory array 234, shift register 236, input address counter 238 and output address counter 240. A suitable device for high speed memory array 234 is the F10405 array available from Fairchild. High speed memory 72 is controlled by gating signal 242 received from central station 20 via signal path 32. Gating signal 242 is set to the ON state by the central station during the time interval when return pulses are expected from the cluster, such information being obtained from the known range of the cluster. The switching of gating signal 242 to its ON state activates input address counter 238, resets the value of an address stored therein, and readies the input address counter to receive trigger signal 244 from trigger circuit 210. Trigger circuit 210 issues trigger signl 244 a predetermined time after each pulse is detected by phase comparator 194, the predetermined time being based upon the time required for the A/D converter to operate. In response to trigger signal 244, input address counter 238 sends WRITE enable signal 246 to the high speed memory array. The WRITE enable signal causes signals 232, 215, 268 to be entered into high speed memory array 234 at the address specified on bus 248. The input address counter then increments its internally stored address, and places the incremented address on bus 248. When the next pulse is received, trigger circuit 210 will again issue trigger signal 244, causing input address counter 238 to repeat the above sequence starting with the incremented address. By such means, the phase, timing and amplitude information for each pulse will be stored in high speed memory array 234 during the approximately 30 microsecond interval during which return pulses due to a single transmitted pulse are received.

At the end of the pulse reception time interval, gating signal 242 will switch to its OFF state, causing input address counter 238 to send signal 250 to output address counter 240 indicating that data recording is complete. In response, output address counter 240 puts the address of the data for the first received pulse on bus 254, and issues READ enable signal 252, causing the data for the first received pulse to be transferred to shift register 236. Enable signal 256 and clock signal 258 then cause such data to be serially transferred to transmitting diode 260 which converts the serial data bits to light pulses for transmission to the central station via fiberoptics cable 262. Output address counter 240 then increments the address on bus 254, and repeats the above sequence until all of the data for a given set of return pulses has been transferred to the central station.

Referring now to FIG. 10, data processing and display unit 28 at central station 20 is shown in greater detail. Data processing and display unit 28 receives data from cluster tracking unit 22 via A/D 26, indicating the position and velocity of the cluster with respect to the ground plane. Data processing and display unit 28 also receives phase reference information from reference circuit 30. Such phase reference information indicates the phase corrections that must be applied to the phase data received from each receiver, due to the phase differences of the subcarrier signal at different receiver sites. Finally, data processing and display unit 28 receives phase and arrival time data for each pulse at each receiver over signal path 32. Pulse amplitude information is also received from receiver $A_0$.

As indicated in FIG. 10, a separate memory unit is assigned to the data received from each receiver, the separate memory units being indicated by numerals 270, 272, 274, 276 and 278. The required data transmission rate between each receiver and its corresponding memory unit at the central station can be determined by assuming that there are up to 100 objects in the cluster. For each pulse received from each object, the receiver will generate 12 bits of timing information, 8 bits of amplitude information (for receiver $A_0$), and 7 bits of phase information, for a total of up to 2,700 bits per receiver per transmitted pulse. This number of bits must be transmitted from the receiver to, for example, memory 270 during the 2 millisecond interval between transmitted pulses, for a data transmission rate of about 1.4 Mb/sec.

The data stored in memories 270 through 278 is the raw, unprocessed data from the various receivers. Associated with each such memory is a separate data processor and a second memory, the primary function of the data processor being to convert the raw phase and timing information stored in memories 270–278 into phase and timing information referenced to virtual receivers in the virtual plane, as described previously in connection with FIG. 3. Such data processors are indicated by numerals 280 through 288, and the second memories are indicated by numerals 290 through 298. Thus assuming for example, that memory 272 corresponds to receiver $A_1$, data processor 282 performs the following operations:

1. The distance between the receiver $A_1$ and the virtual plane, $A_1A_1'$ (FIG. 3) is determined based on equation (7) above. Such distance is then used to determine the time and phase differences between $A_1$ and $A_1'$.
2. The distance between the virtual receiver and $A_0$, $A_1'A_0$, is determined based upon equation (9) above.
3. For each pulse, the phase is adjusted by the phase difference calculated in step 1 above, as well as by the phase correction signal provided by reference circuit 30.
4. For each pulse, the arrival time is adjusted by the time difference calculated in step 1 above.

Data processor 282 then stores the modified phase and arrival time information, together with the distance $A_1'A_0$, in memory 292. A suitable microprocessor for use in data processors 280–288 is the R68000 microprocessor available from Rockwell.

The final task to be performed by data processing and display unit 28 is the analysis of the virtual receiver data stored in memories 290–298. To handle such data processing on a real time basis, a separate processor $P_1$, $P_2$. . . $P_N$ is assigned to each object, the correspondence between objects and processors being based upon the arrival times of the pulses. In particular, central processor 300 organizes the data in memories 290–298 based upon pulse arrival times, and then transfers all data corresponding to the Nth pulse in arrival sequence to processor $P_N$. Central processor 300 also controls gating signal 242 based upon range information received from cluster tracking unit 22. Each processor $P_N$ then processes all relevant information for object N. At times, two or more objects may occupy the same range slot, i.e., have identical arrival times. However, the changing aspect angle of the cluster with respect to the receivers will resolve such ambiguities over time, so that the object data can be assigned to the proper processor $P_N$. In certain instances, a comparatively large object could occupy two or more 10 nanoseconds range slots, such that each receiver would produce two or more sets of data corresponding to that object. When this occurs, such information could be used to supplement the pulse amplitude data produced by receiver $A_0$.

Each processor $P_N$ performs the following operations on the data for its corresponding object:

1. The phase differences between $A_1'$ and $A_2'$ and between $A_3'$ and $A_4'$ are determined. These differences provide a "fine" determination of object direction with respect to the X' and Y' axes, as indicated above in connection with the discussion of equations (2) through (5).
2. The phase differences between each virtual receiver and receiver $A_0$ are determined, and then for each satellite receiver pair ($A_1$, $A_2$ and $A_3$, $A_4$), such differences are subtracted (see equation (5)) to provide a "coarse" determination of direction with respect to the X' and Y' axes.
3. The total phase differences with respect to the X' and Y' axes, $P_x$ and $P_y$, are determined by combining the results of steps 1 and 2.
4. $P_x$ and $P_y$ are each averaged, based upon the following formula:

$$A_i = \frac{P - A_{i-1}}{2^k} + A_{i-1} \quad (11)$$

where $A_i$ is the new average, $A_{i-1}$ is the prior average, P represents either $P_x$ or $P_y$, and k is an integer. The averaging period is based upon a power of two so that the division can be performed by a simple shift operation.

5. The averaged phase differences $P_x$ and $P_y$ are combined with the virtual baseline lengths $A_1'A_2'$ and $A_3'A_4'$ to calculate the angular displacements $\Delta\theta_x$ and $\Delta\theta_y$ of the object from the Z' axis in the X' and Y' directions. This calculation is performed using equation (1) and the cosine approximation previously discussed.
6. The angular displacements $\Delta\phi_x$ and $\Delta\phi_y$, the range R from receiver $A_0$ to the reference point, and the pulse arrival time are then used to determine the object position $(T_x, T_y, T_z)$ in the X'Y'Z' coordinate system. The calculations of $T_x$ and $T_y$ make use of the following small angle approximations:

$T_x = R \Delta\phi_x$ $T_y = R \Delta\phi_y$ $T_z$ is simply the range R, modified by the pulse arrival time times the speed of light.

The position of the object with respect to the cluster center is passed from each processor $P_N$ to display unit 310. Display unit 310 also receives cluster center information, and amplitude information for each object, directly from central processor 300. Thus the information available to display unit 310 consists of the object center position and velocity data from cluster tracking unit 22 via central processor 300, and the location of each object relative to the object's center, as well as the amplitude of the return at receiver $A_0$ for each object. The display unit assembles this information into a three-dimensional display of the individual objects and their particular signatures. The information could also be subjected to further processing in an effort to identify each object or to discriminate between different types of objects.

It will be understood that the present invention may be embodied in other specific forms without departing from the central characteristics thereof. The present examples and embodiments are therefore to be considered in all respects as illustrative and not restrictive, and the invention is not to be limited to the details given herein, but may be modified within the scope of the following claims.

The embodiments of the invention in which an exclusive property or privilege is claimed are defined as follows:

1. A radar system for tracking a plurality of individual moving objects that form a cluster, comprising:
   a transmitter including means for transmitting a series of pulses of radiant energy toward the cluster such that each reflective object responds to each transmitted pulse by producing a return pulse;
   receiver means comprising a plurality of receivers positioned to receive the return pulses, the receivers including means for determining the relative phase and the relative arrival time of each return pulse and means for producing pulse phase data and pulse time data corresponding respectively thereto;
   cluster tracking means for producing in real time reference information indicative of the position of a moving reference point associated with the mean position of the objects; and
   processing means for receiving the pulse phase data, pulse time data and reference information, and for producing in real time displacement information indicative of the relative position of each object with the respect to a moving coordinate system defined with respect to the receivers and to the reference point.

2. The radar system of claim 1, wherein the means for producing displacement information comprises an interferometer system.

3. The system of claim 2, wherein the interferometer system comprises a central receiver, a pair of first satellite receivers positioned on opposite sides of the central receiver along a first axis that passes through the central receiver, and a pair of second satellite receives positioned on opposite sides of the central receiver along a second axis that passes through the central receiver and that is inclined with respect to the first axis.

4. The system of claim 3, wherein the moving coordinate system has one axis coincident with a line from the central receiver to the reference point.

5. The system of claim 2, wherein the interferometer system includes reference means for generating a phase reference signal and means for transmitting the phase reference signal to all receivers, and wherein each receiver is operative to determine the relative phase of each return pulse by comparing the phase of the return pulse to the phase of the phase reference signal, and by producing pulse phase data corresponding to the difference therebetween.

6. The system of claim 5, wherein the reference means includes means for superimposing a timing signal on the phase reference signal, and wherein each receiver includes means for detecting the timing signal and for determining the relative arrival time of each return pulse by comparing the arrival time of each return-pulse to the timing signal.

7. The system of claim 6, wherein the phase reference signal comprises a train of pulses at a constant frequency, and wherein the timing signal comprises the deletion of certain ones of said pulses.

8. The system of claim 5, further comprising means for transmitting the phase reference signal from each receiver to the reference means, and wherein the reference means comprises phase comparator means for comparing, for each receiver, the phase of the phase reference signal transmitted to that receiver to the phase of the phase reference signal returned from the receiver, and means for generating corresponding phase correction data for that receiver.

9. The system of claim 2, wherein the processing means comprises a plurality of first processors, one first processor being associated with each receiver, each first processor being adapted to receive the pulse phase data and pulse time data from its associated receiver and to produce virtual phase data and virtual time data corresponding respectively thereto, the virtual phase data and virtual time data corresponding respectively to the relative phase and the relative arrival time of the pulses at a virtual receiver located by projecting the receiver onto a virtual plane normal to a reference axis defined with respect to a line having one end fixed with respect to the receivers and a second end at the reference point.

10. The system of claim 9, wherein the processing means comprises a plurality of second processors, each second processor being operative to receive the virtual phase data and virtual time data for a single object, and including means for processing the virtual phase and virtual time data in real time to produce the displacement information for that object.

11. The system of claim 2, wherein the transmitter and each receiver include an antenna, and wherein the cluster tracking means includes means responsive to the reference information for controlling the orientation of the antennas such that the transmitted pulses are directed towards the reference point.

12. The system of claim 3, wherein the reference point is the mean position of the objects that form the cluster, wherein the central receiver comprises a monopulse receiver that is adapted to produce a cluster signal indicative of the mean position of the objects, and wherein the cluster tracking means is operative to receive the cluster signal from the monopulse receiver, and includes means for producing in real time signals indicating the mean position of the objects with respect to the first and second axes.

13. An interferometer radar system for tracking a plurality of moving objects, comprising:
a transmitter for transmitting a series of pulses of radiant energy towards the objects such that each reflective object responds to each transmitted pulse by producing a return pulse;
a plurality of receivers positioned and adapted to receive the return pulses and to determine the relative phase and the relative arrival time of each return pulse and to produce pulse phase data and pulse time data corresponding respectively thereto;
means for determining in real time displacement information indicative of the relative orientation of each object with respect to a moving reference axis, the means for determining the displacement information comprising a processing unit operative to receive the pulse phase data and pulse time data from each receiver and to produce the displacement information therefrom in real time, the processing unit comprising a plurality of first processors, one first processor being associated with each receiver, each first processor being adapted to receive the pulse phase data and pulse time data from its associated receiver and to produce virtual phase data and virtual time data corresponding respectively thereto, the virtual phase data and virtual time data corresponding to the relative phase and the relative arrival time respectively of the pulses at a virtual receiver located by projecting the receiver on to a virtual plane normal to the reference axis.

14. The system of claim 13, wherein the processing unit comprises a plurality of second processors, each second processor being operative to receive the virtual phase data and virtual time data for a single object, and for processing the virtual phase data and virtual time data in real time to produce the displacement information for that object.

15. A system for determining the relative phase of a radiant signal at a plurality of spaced apart positions, comprising:
reference means for generating a phase reference signal;
means for transmitting the phase reference signal to each of said positions;
a receiver located at each position, each receiver being operative to receive the radiant signal and the phase reference signal, to determine the relative phase of the radiant signal at the receiver by comparing the phase of the radiant signal to the phase of the phase reference signal, and to produce phase data corresponding to the difference therebetween;
means for transmitting the phase reference signal from each receiver to the reference means;
phase comparator means associated with the reference means for comparing, for each receiver, the phase of the phase reference signal transmitted to that receiver to the phase of the phase reference signal transmitted from that receiver, and for generating corresponding phase correction data for that receiver; and
processing means for receiving the phase data and the phase correction data for each receiver and for generating therefrom data representing the relative phase of the radiant signal at each position.

16. The system of claim 15 wherein the reference means includes means for superimposing a timing signal on the phase reference signal, and wherein each receiver includes means for detecting the timing signal and for determining the relative arrival time of the radiant signal by comparing the arrival time of the radiant signal to the timing signal.

17. The system of claim 16, wherein the phase reference signal comprises a train of pulses at a constant frequency, and wherein the timing signal comprises the deletion of certain ones of said pulses.

18. A method for the radar tracking of a plurality of individual moving objects that form a cluster, the method comprising:
producing in real time reference information indicative of the position of a moving reference point associated with the mean position of the objects; and,
producing in real time displacement information indicative of the relative position of each object with respect to the reference point.

19. The method of claim 18, wherein the step of producing the displacement information comprises transmitting a series of transmitted pulses of radiant energy towards the cluster such that each reflective object responds to each transmitted pulse by producing a return pulse, receiving each return pulse at each of a plurality of receivers, and determining the relative phase and the relative arrival time of each return pulse at each receiver.

20. The method of claim 19, wherein the step of determining the relative phase comprises generating a phase reference signal, transmitting the phase reference signal to all receivers, and causing each receiver to determine the relative phase of each return pulse by comparing the phase of the return pulse to the phase of the phase reference signal.

21. The method of claim 20, wherein the step of determining the relative arrival time comprises superimposing a timing signal on the phase reference signal, detecting the timing signal at each receiver, and determining the arrival time of each return pulse by comparing the arrival time of each return pulse to the timing signal.

22. The method of claim 19, wherein the step of producing displacement information comprises determining the position of each object with respect to a virtual coordinate system having one axis coincident with a line having one end fixed with respect to the receivers and its other end at the reference point.

* * * * *